Feb. 16, 1971 S. H. W. BROWNING 3,564,549
DIVERSITY DIRECTION FINDING SYSTEMS
Filed March 27, 1957 3 Sheets-Sheet 1

Samuel H. W. Browning,
INVENTOR

BY *WBChilds*

ATTORNEY

Feb. 16, 1971  S. H. W. BROWNING  3,564,549
DIVERSITY DIRECTION FINDING SYSTEMS
Filed March 27, 1957
3 Sheets-Sheet 2

Samuel H. W. Browning,
INVENTOR

BY
ATTORNEY

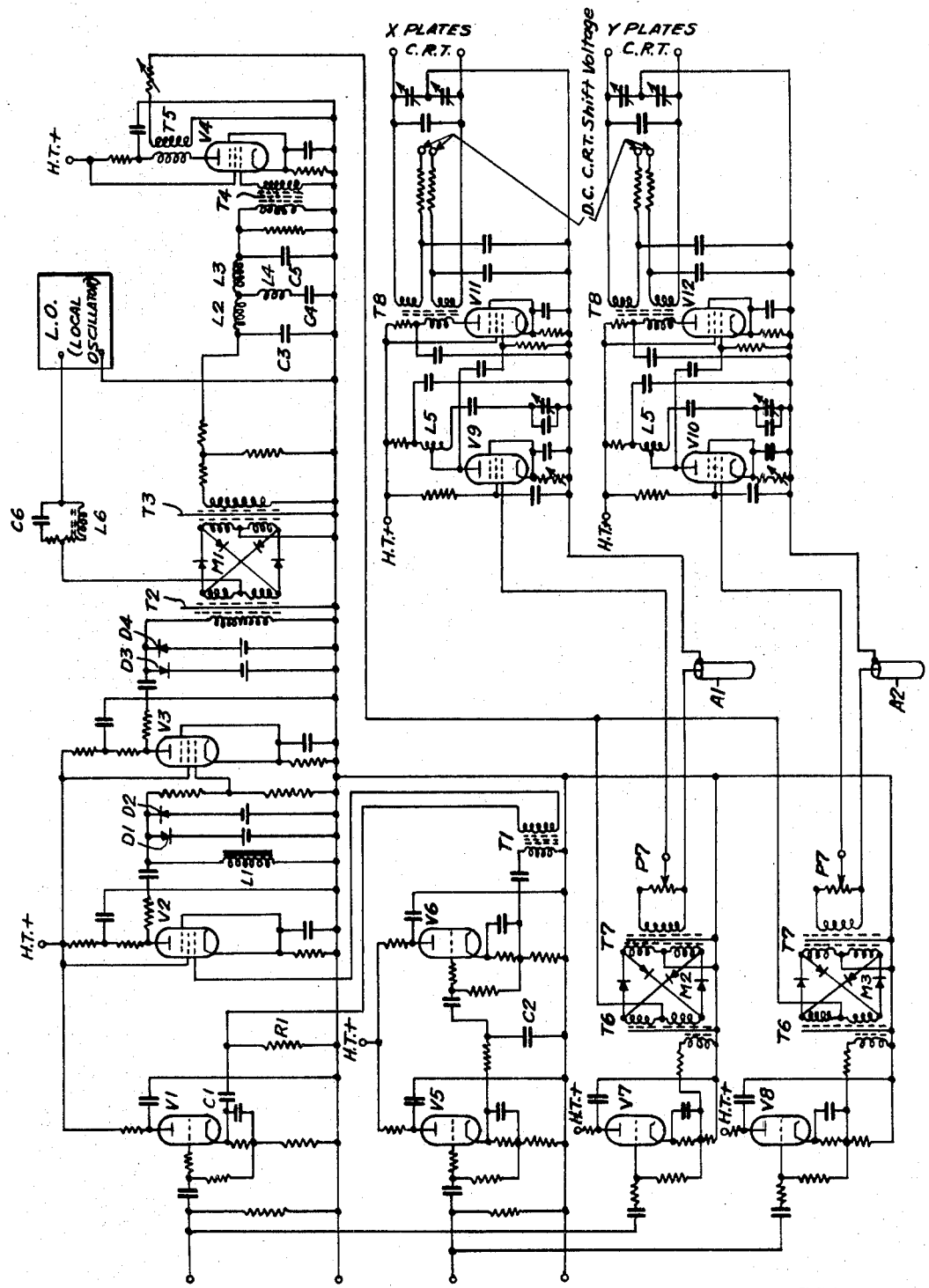

United States Patent Office 3,564,549
Patented Feb. 16, 1971

3,564,549
DIVERSITY DIRECTION FINDING SYSTEMS
Samuel Henry Wilson Browning, Alverstoke, Gosport, England, assignor to The Commissioners for Executing the Office of Lord High Admiral of the United Kingdom of Great Britain and Northern Ireland
Filed Mar. 27, 1957, Ser. No. 649,263
Int. Cl. G01s 3/06
U.S. Cl. 343—121                10 Claims

ABSTRACT OF THE DISCLOSURE

Diversity direction finding system wherein the outputs of two or more direction finding stations are combined using conversion units having a common local oscillator giving a reference phase to hold the conversion units in phase alignment.

---

This invention relates to improvements in diversity direction finding systems. In the system at present in use a number of stations are employed, each station being operated separately and comprising a directional aerial system connected through suitable receivers to the two sets of deflecting plates of a C.R.O. the resultant trace on which gives a bearing of the direction of arrival of the received signal, the bearing obtained at each station then being transmitted to a central point. With long distance signals considerable wandering of the displayed bearing occurs. If the desired signal was present for long periods of time this wandering around the mean might not be a serious embarrassment, but the more important signals may last but a few seconds and, therefore, time averaging becomes impossible. It is to overcome this difficulty that a number of stations spaced apart are used thereby providing space averaging in lieu of time averaging for signals whose direction of arrival is varying and different at each station due to ionospheric causes. Short signals may, therefore, be received and the average bearing of the several stations computed.

One difficulty with this system is that it requires as many operators as there are stations and a second is that the bearing will be changing due to ionospheric causes making accurate reading for short period signals difficult. A method for overcoming these objections would be to remotely control the receivers at each station from the central point to which the outputs of the receivers are transmitted by cable and combined on a single C.R.T., such a display should ideally give a weighted average bearing of the several stations. The weighting would be arranged to reduce the contribution a station makes to the display during periods of severe fading at that station, it being noted that due to ionospheric causes the fading of all stations does not occur simultaneously but is distributed in a random manner, consequently the inaccurate bearings that a station gives during periods of fading would not be contributed to the combined display. The combined display would, therefore, have an accuracy better than the mean bearing of the several stations, and further, the displayed bearing would vary less around its mean value than that of the individual stations. Means for controlling the receivers at each station from the central point will be familiar to those concerned in the art but, due to the spatial separation of the stations, the different site effects and wave interference the outputs of the several separate receivers are in a state of continuously varying relative phase and this has hitherto prevented their simple addition in a single display. It is an object of the present invention to provide means whereby the outputs of two or more direction finding stations may be combined to produce a single display.

In order that the invention may be more fully understood reference will now be made by way of example to the accompanying drawings in which:

FIG. 4 is a circuit diagram of the conversion unit shown in FIG. 2.

Figure 1:
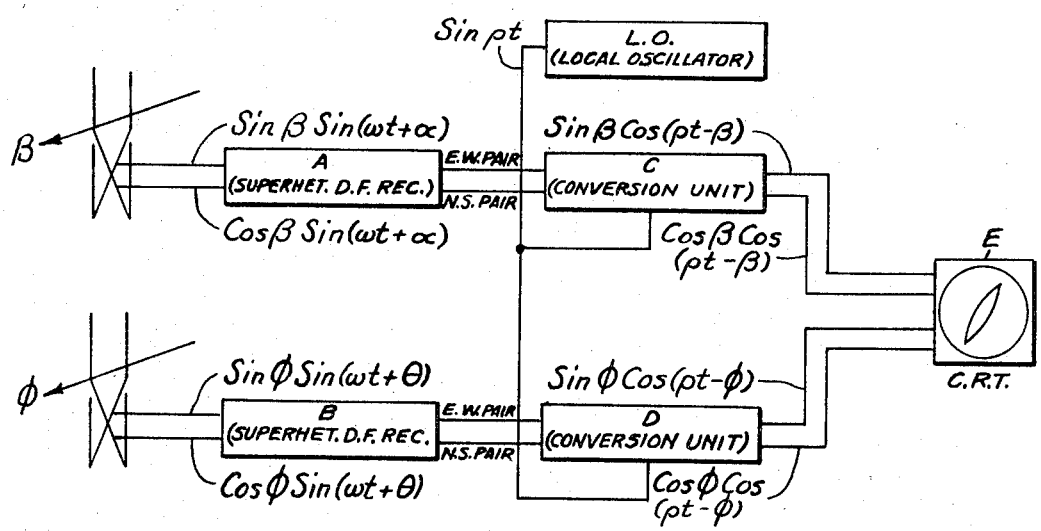
FIG. 1 is a block schematic drawing for a system according to the present invention.

Referring to FIG. 1 where, for the sake of simplicity, only two stations are shown combined, it being noted that as many stations as desired may be added, each of the stations comprises an Adcock aerial system in conjunction with a twin channel superheterodyne D.F. receiver A or B. Each Adcock aerial system consists of four elements, two being on a line North-South and two being on a line East-West, the output of the N.S. pair being fed to one channel of the associated receiver whilst the output of the E.W. pair is fed to the other channel of the receiver.

The output voltage of the N.S. channel of the Adcock aerial and receiver A will be proportioned to:

$$\text{Cos } \beta \text{ Sin } (wt+\alpha)$$

and for the E.W. channel it will be proportional to:

$$\text{Sin } \beta \text{ Sin } (wt+\alpha)$$

Similarly the output voltage of the N.S. channel of the Adcock aerial and receiver B will be proportional to:

$$\text{Cos } \phi \text{ Sin } (wt+\theta)$$

and for the E.W. channel it will be proportional to:

$$\text{Sin } \phi \text{ Sin } (wt+\theta)$$

where $\beta$ and $\phi$ represent the directions of arrival for the signal at the two stations and may differ by up to 20° or more for long range signals. The terms Sin $\beta$, Cos $\beta$, Sin $\phi$ and Cos $\phi$ result from the characteristics of the Adcock aerials and operate as multiples of the amplitude and phase of the signals Sin $(wt+\alpha)$ and Sin $(wt+\theta)$.

As previously stated $\alpha$ and $\theta$ have no fixed relationship and continually vary in a random manner due to ionospheric and spacing effects and it is this difficulty that has hitherto prevented the direct addition or combination of the outputs of spaced twin channel D.F. receivers. This difficulty is overcome by the conversion units C and D by means that will be described later. The local oscillator L.O. is common to all the conversion units and gives the reference phase which holds the conversion units in phase alignment. The overall effect of the conversion units C and D is to make the following conversions:

Sin $\beta$ Sin $(wt+\alpha)$ becomes Sin $\beta$ Cos $(pt-\beta)$
Cos $\beta$ Sin $(wt+\alpha)$ becomes Cos $\beta$ Cos $(pt-\beta)$
Sin $\phi$ Sin $(wt+\theta)$ becomes Sin $\phi$ Cos $(pt-\phi)$
Cos $\phi$ Sin $(wt+\theta)$ becomes Cos $\phi$ Cos $(pt-\phi)$ It will be noticed that before conversion the phase difference between the two signals is equal to $\alpha-\theta$ and is, therefore, quite random, while after conversion the phase difference is $\beta-\phi$ which is normally limited to about $\pm 20°$, the signal may, therefore, be directly added, combination taking place in the addition unit E which is normally a C.R.O. The result of the difference between $\beta$ and $\phi$ is the production of a narrow ellipse on the display and it may be shown that the major axis of this ellipse is the exact mean bearing of the two signals. As the difference between the directions of arrival $\beta$ and $\phi$ increases up to the limit $\beta-\phi=90°$ the ellipse degenerates into a circle. Thus, if due to exceptional ionospheric conditions one station gives a N.S. bearing while the second gives an E.W. bearing and both are of equal amplitude then the display will show a circle which indicates that the direction of the signal is indeterminate.

Figure 2:
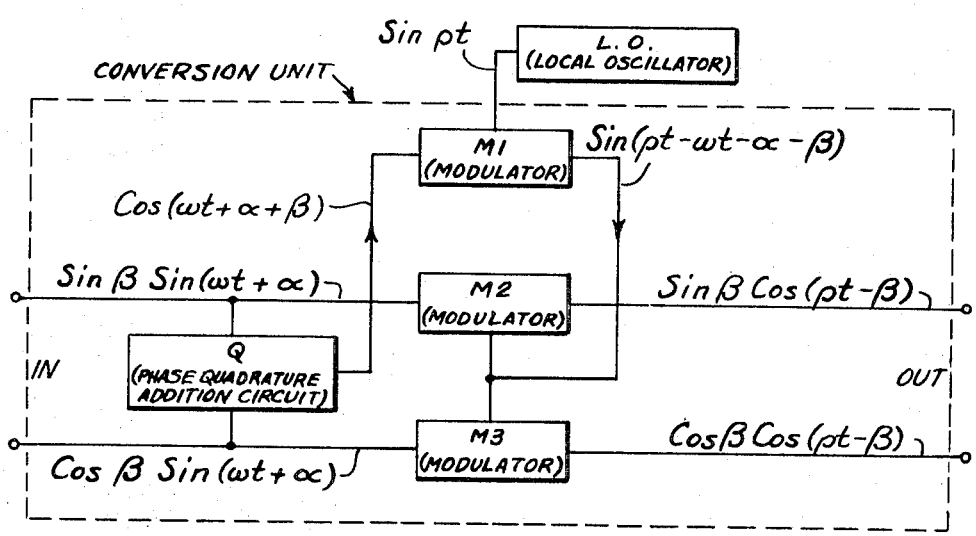
FIG. 2 is a block schematic drawing of a single conversion unit comprising either unit C or unit D of FIG. 1.

A single conversion unit C or D is shown in greater detail in FIG. 2. As many stations as desired may be employed in the system provided each is associated with a conversion unit which will permit the outputs of the separate stations to be combined in a single display.

The derivation of the mathematical relationships given on FIG. 2 are given below. It will be seen that $\alpha$ which represents the phase of the input signal has been eliminated in the output, this is brought about by the combination of the phase quadrature addition circuit Q and the modulators M1, M2 and M3. It will be observed that the signal level in each channel is proportional to either the sine or the cosine of $\beta$ which is the direction of arrival of the signal; this, of course, is a fundamental characteristic of the Adcock aerial system. In consequence, the numerical values of the voltages in each channel must pass through zero and 180° for certain values of $\beta$, thus such voltages could not be employed for switching the modulators M1, M2 and M3; therefore the phase quadrature circuit Q is employed, this having a constant output irrespective of the value of $\beta$. One oscillator L.O. is common to all the conversion units employed and gives the reference phase which holds the conversion units in phase alignment. The output frequency of the system is equal to the frequency of this oscillator and the choice of oscillator frequency requires careful consideration in order that the undesired products of modulation may be adequately suppressed.

An unusual feature of the system assists in obtaining the desired selectivity in the output circuits of modulators M2 and M3. In normal twin channel D.F. systems the greatest care must be taken to obtain and maintain symmetry in the shape of the selectivity characteristics of each channel, this requirement being due to the change in frequency (about ±5 kc./s.) that occurs in the channels during the process of tuning, any small phase misalignment being displayed as an ellipse. In the output circuit of the conversion unit, however, it will be seen that the frequency is constant irrespective of change of input frequency and, therefore, very narrow bandwidth selectivity circuits may be employed without the necessity of matching the shape of the selectivity curves. Matching is, however, necessary to form a true parallelogram when an interfering signal is present. The above high selectivity will be capable of supressing the undesired frequencies of modulation. It might be thought that if the output frequency is constant for different input frequencies that it follows that interfering input frequencies would come out at the constant output frequency and thus pass through the selective circuit. This does not occur due to the "Beatty" effect in the modulators together with the provision of limiters.

The "Beatty" effect in modulators is due to the large amplitude of the switching current which saturates the switching diodes into a "conducting" or "non-conducting" condition; the effective fundamental frequency of switching is, therefore, half the number of reversals. The presence of small amplitude undesired signals will, therefore, not affect the frequency of switching and will thus become suppressed by the selective circuits as in this circumstance they will be of different frequency from that of the pass band of the selective circuits. The larger of two signals in the pass band of the equipment will have the output phase characteristic equation given in FIG. 2 and, therefore, the outputs of several conversion units may be added. The smaller signal will, however, be in random phase and the resultant display will be substantially a parallelogram as has been found in practice. The frequency range over which the conversion unit will normally be required to operate will be the I.F. frequency of the D.F. receiver±its normal limits±the bandwidth of the receiver. As, in the absence of selectivity between Q and M1, there is no reason for limiting the frequency range it may be taken as ±10 kc./s., which is somewhat greater than the bandwidth of the receiver used. It is a requirement that there shall be negligible phase shift between the output of Q and the output of M1 or that it shall be matched to that of other conversion units, while at the same time an output filter after M1 is necessary to suppress undesired frequencies of modulation; this can be achieved by suitably choosing the frequency of the local oscillator L.O. (Sin $pt$), with relation to that of the signal (Sin $wt$). For example, suppose the frequency of the latter is 450 kc./s. and of the former 349 kc./s., then the desired output frequency of M1 will be the difference frequency which is 101 kc./s. and the nearest undesired frequency will be the carrier which is 349 kc./s. and the product frequency 799 kc./s. To separate these frequencies a low pass filter is employed having a value $f_c = 250$ kc./s., $f_\infty = 349$ kc./s. constructed from a constant K section and an M-derived section. Over the frequency range 101±10 kc./s. the phase shift will be of the order of ±15°. Thus the filters in the several conversion units should have similar characteristics.

Figure 3:
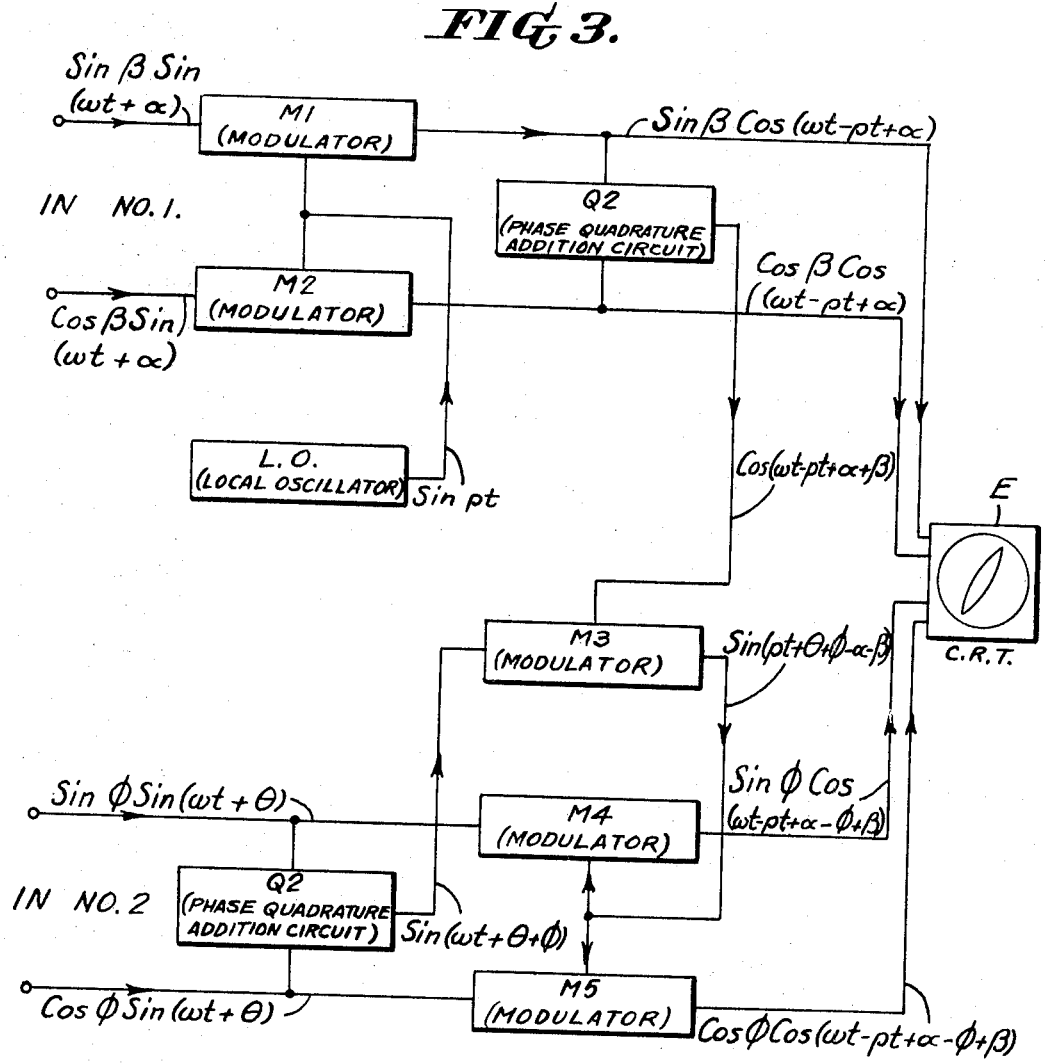
FIG. 3 is a block schematic drawing of an alternative system according to the present invention.

FIG. 3 is a block schematic diagram of an alternative system according to the present invention shown for two stations No. 1 and No. 2, the aerial systems and receivers associated with these stations not being shown. L.O. is the local oscillator, Q1 and Q2 are phase quadrature addition circuits, and M1 to M5 are modulators, whilst E is the addition unit. It will be seen that in this system the apparatus associated with each of the two stations is different and it is thus necessary to show the apparatus for two stations. A drawback to this system is that if station No. 1, normally regarded as the "Master," fails or fades then station No. 2, and any others used, will also fail or fade and, further, since the phase quadrature addition circuits Q1 and Q2 operate at different frequencies, technical difficulties may, therefore, be expected in obtaining phase alignment between the two stations. A distinction between this system and that shown in FIG. 1 and FIG. 2 is that whereas in that system the output frequency is fixed, in this system the output frequency contains the term $wt$ and is therefore dependent upon the signal frequency. This may be an advantage under certain conditions.

Referring to FIG. 4, which is a circuit diagram of the conversion unit shown in FIG. 2, the modulators M1, M2, and M3 are marked in both drawings. The phase quadrature addition circuit (Q) comprises the condensers C1 and C2 together with the resistors R1 and R2. V1 and V5 are cathode followers which provide stable circuit impedances to ensure the satisfactory operation of the phase quadrature circuit and adequate return attenuations to avoid coupling between the two input circuits where they branch off to V7 and V8. The phase quadrature addition occurs at the grid of V2. The biased limiters D1 and D2 following V2 and D3 and D4 following V3 provide the controlled "Beatty" effect, avoid overloading modulator M1, and ensure constant levels and waveforms with varying input amplitude thereby ensuring that the ultimate switching voltage of modulators M2 and M3 is of adequate amplitude with the smallest input signal and that the crystals contained in the modulators are not saturated or damaged by large signals.

The filter comprising L2, L3, L4, C3, C4 and C5 consists of low pass constant K and M derived sections, the cut-off frequency and the frequency of infinite attentuation of which is such that the frequency of the local oscillator L.O. passed due to any unbalance of the modulator M1 and spurious frequencies of modulation are suppressed. Each of the modulators M2 and M3 is preceded by a cathode follower, V7 and V8, primarily to provide a considerable return attenuation in the circuit between the switching frequency of modulators M2 and M3 and the input circuits and at the same time to ensure stable conditions between the input circuits and the modulators. The voltages developed in the output potentiometer P7 across the secondary windings of transformers T7 of the several conversion units are added in series at the adding connections A1 and A2 and are amplified by the amplifier represented by V9–V12 which provides high selectivity together with the required output voltages to operate the C.R.O. The phase shift circuit comprising L6 and C6 following the local oscillator L.O. is to correct the phase of the output signal from the conversion unit. The most sensitive method of ensuring correct adjustment is to inject signals having a 90° difference in direction of arrival and equal amplitude into two conversion units. The resultant display should then be a circle after the simultaneous adjustment of the above phase shift circuit and the gain potentiometer P7 following transformer T7.

The derivation of the mathematical relationships shown on FIGS. 1 and 2 will now be given.

If an Adcock aerial system consists of four elements, two being on a line North-South and two on a line East-West, then the signal received by the East-West pair is given by the relationship:

$$\text{Sin } \beta A \text{ Sin } (w_1 t + \alpha)$$

where $\beta$ is the angle of arrival of the signal with respect to North, A the signal amplitude and $\text{Sin } (w_1 t + \alpha)$ is the frequency and phase of the signal.

In a similar manner:

$$\text{Cos } \beta A \text{ Sin } (w_1 t + \alpha)$$

is the signal received by the North-South pair of elements.

If a second Adcock aerial is erected, spaced apart from the first, the outputs will be given by:

$$\text{Sin } \phi A \text{ Sin } (w_1 t + \theta)$$
and
$$\text{Cos } \phi A \text{ Sin } (w_1 t + \theta)$$

and for a third Adcock aerial, spaced apart from the other two, the outputs will be given by:

$$\text{Sin } \lambda A \text{ Sin } (w_1 t + \mu)$$
and
$$\text{Cos } \lambda A \text{ Sin } (w_1 t + \mu)$$

the difference between the above three pairs of aerial outputs being due to ionospheric and aerial spacing effects. In practice the direction of arrival of the signal $\beta$, $\phi$, and $\lambda$ will vary around a mean bearing in a random manner. Unfortunately it is not possible to combine the signals directly to obtain an average of $\beta$, $\phi$, and $\lambda$ due to the wide variation of $\alpha$, $\theta$, and $\mu$. It is now proposed to show how $\alpha$, $\theta$, and $\mu$ may be brought into phase alignment thus permitting direct addition of the signals.

Referring to FIG. 2, the outputs from the first Adcock aerial, after reception in a twin channel receiver and reduction in frequency in the I.F. channels, became:

$$\text{Sin } \beta \text{ Sin } (wt + \alpha) \quad (1)$$

$$\text{Cos } \beta \text{ Sin } (wt + \alpha) \quad (2)$$

and are combined in phase quadrature in the phase quadrature addition circuit represented by Q. In this circuit Equation 2 above has 90° added to $\text{Sin } (wt+\alpha)$ by normal electrical methods which thus becomes $\text{Cos } (wt+\alpha)$. If Equations 1 and 2 are now added:

$$Q = \text{Sin } \beta \text{ Sin } (wt+\alpha) + \text{Cos } \beta \text{ Cos } (wt+\alpha)$$

$$= \text{Cos } (wt+\alpha+\beta) \quad (3)$$

where Q is the output of the phase quadrature addition circuit Q. Equation 3 and the output of the local oscillator L.O. ($\text{Sin } pt$) are combined in modulator M1 giving:

$$M1 = \text{Sin } pt \text{ Cos } (wt+\alpha+\beta)$$

$$= \tfrac{1}{2} \text{Sin } (pt+wt+\alpha+\beta) + \tfrac{1}{2} \text{Sin } (pt-wt-\alpha-\beta)$$

By means of suitable wave filters the difference frequency is selected, thus the final output of the modulator M1 is:

$$M1 = \text{Sin } (pt-wt-\alpha-\beta) \quad (4)$$

Equations 1 and 4 are combined in modulator M2 giving:

$$M2 = \text{Sin } \beta \text{ Sin } (wt+\alpha) \text{ Sin } (pt-wt-\alpha-\beta)$$

$$= \text{Sin } \beta \left[ \tfrac{1}{2} \text{Cos } (wt+\alpha-pt+wt+\alpha+\beta) \right.$$

$$\left. - \tfrac{1}{2} \text{Cos } (wt+\alpha+pt-wt-\alpha-\beta) \right]$$

$$= \text{Sin } \beta \left[ \tfrac{1}{2} \text{Cos } (2wt+2\alpha-pt+\beta) - \tfrac{1}{2} \text{Cos } (pt-\beta) \right]$$

By means of wave filters the right hand term is selected giving the output of modulator M2:

$$M2 = \text{Sin } \beta \text{ Cos } (pt-\beta) \quad (5)$$

which is now the output of the East-West channel. In a similar manner the output of the North-South channel is obtained:

$$M3 = \text{Cos } \beta \text{ Cos } (pt-\beta) \quad (6)$$

Equations 5 and 6 are applied as rectangular co-ordinates on a C.R.T. as the X and Y traces respectively, the display for the first Adcock aerial may therefore be written as:

$$\text{Cos } \beta \text{ Cos } (pt-\beta) + j \text{ Sin } \beta \text{ Cos } (pt-\beta) \quad (7)$$

in a similar manner the display for the second aerial may be written as:

$$\text{Cos } \phi \text{ Cos } (pt-\phi) + j \text{ Sin } \phi \text{ Cos } (pt-\phi) \quad (8)$$

and the display for the third aerial may be written as:

$$\text{Cos } \lambda \text{ Cos } (pt-\lambda) + j \text{ Sin } \lambda \text{ Cos } (pt-\lambda) \quad (9)$$

As $\beta$, $\phi$, and $\lambda$ are normally within ±10° direct addition on the C.R.T. display is possible.

The real and imaginary parts of Equations 7, 8, and 9 may be added and $|A|^2$ which is the square of the magnitude of the display will equal the sum of the squares of the real and imaginary parts. After substitution of the trigonometrical identities $\text{Sin}^2 \lambda + \text{Cos}^2 \lambda = 1$ and $\text{Cos } \lambda \text{ Cos } \beta + \text{Sin } \lambda \text{ Sin } \beta = \text{Cos } (\lambda-\beta)$, $|A|^2$ simplifies to:

$$|A|^2 = \text{Cos}^2 (pt-\beta) + \text{Cos}^2 (pt-\phi) + \text{Cos}^2 (pt-\lambda)$$

$$+ 2 \text{ Cos } (pt-\lambda) \text{ Cos } (pt-\beta) \text{ Cos } (\lambda-\beta)$$

$$+ 2 \text{ Cos } (pt-\lambda) \text{ Cos } (pt-\phi) \text{ Cos } (\lambda-\phi)$$

$$+ 2 \text{ Cos } (pt-\beta) \text{ Cos } (pt-\phi) \text{ Cos } (\beta-\phi)$$

If $\beta$, $\phi$, and $\lambda$ are not equal an ellipse is formed and it is normal to take the bearing as the major axis of the ellipse which corresponds to the maxima of the magnitude, therefore the above expression is expanded and terms not containing $t$ omitted:

$$Z = \tfrac{1}{2} \text{Cos } 2(pt-\beta) + \tfrac{1}{2} \text{Cos } 2(pt-\lambda) + \tfrac{1}{2} \text{Cos } 2(pt-\phi)$$

$$+ 2 \text{ Cos } (pt-\lambda) \text{ Cos } (pt-\beta) \text{ Cos } (\lambda-\beta)$$

$$+ 2 \text{ Cos } (pt-\lambda) \text{ Cos } (pt-\phi) \text{ Cos } (\lambda-\phi)$$

$$+ 2 \text{ Cos } (pt-\beta) \text{ Cos } (pt-\phi) \text{ Cos } (\beta-\phi)$$

$$dZ/dt = -p \text{ Sin } 2(pt-\beta) - p \text{ Sin } 2(pt-\lambda) - p \text{ Sin } 2(pt-\phi)$$

$$-p \, 2 \text{ Cos } (\lambda-\beta) \text{ Cos } (pt-\lambda) \text{ Sin } (pt-\beta)$$

$$-p \, 2 \text{ Cos } (\lambda-\beta) \text{ Cos } (pt-\beta) \text{ Sin } (pt-\lambda)$$

$$-p \, 2 \text{ Cos } (\lambda-\phi) \text{ Cos } (pt-\lambda) \text{ Sin } (pt-\phi)$$

$$-p \, 2 \text{ Cos } (\lambda-\phi) \text{ Cos } (pt-\phi) \text{ Sin } (pt-\lambda)$$

$$-p \, 2 \text{ Cos } (\beta-\phi) \text{ Cos } (pt-\beta) \text{ Sin } (pt-\phi)$$

$$-p \, 2 \text{ Cos } (\beta-\phi) \text{ Cos } (pt-\phi) \text{ Sin } (pt-\beta)$$

A general solution for the value of $t$ required to equate the above expression to zero has not been found. However, a particular case of considerable importance where three stations are being combined as in the above expression is the symmetrical one where:

$$\lambda = \tfrac{1}{2}(\phi+\beta) \quad (10)$$

The value of $t$ is then found to be:

$$t = \frac{\beta+\phi}{2p} \quad (11)$$

Equation 11 is also found to be the complete solution in the case where two stations only are combined.

Adding Equations 7, 8, and 9 the bearing $\chi$ is given by:

$$\chi = \tan^{-1} \frac{\sin \beta \cos (pt-\beta) + \sin \lambda \cos (pt-\lambda) + \sin \phi \cos (pt-\phi)}{\cos \beta \cos (pt-\beta) + \cos \lambda \cos (pt-\lambda) + \cos \phi \cos (pt-\phi)}$$

Substituting Equations 10 and 11 gives the bearing of the major axis of the ellipse in the particular three station symmetrical case:

$$\chi = \tan^{-1} \frac{\cos \tfrac{1}{2}(\phi-\beta)(\sin \beta + \sin \phi) + \sin \tfrac{1}{2}(\phi+\beta)}{\cos \tfrac{1}{2}(\phi-\beta)(\cos \beta + \cos \phi) + \cos \tfrac{1}{2}(\phi+\beta)} \quad (12)$$

Similarly for the two station case, adding Equations 7 and 8 the bearing $\chi$ is given by:

$$\chi = \tan^{-1} \frac{\sin \beta \cos (pt-\beta) + \sin \phi \cos(pt-\phi)}{\cos \beta \cos (pt-\beta) + \cos \phi \cos (pt-\phi)} \quad (13)$$

and substituting Equation 11 gives the bearing of the major axis of the ellipse in the general two station case:

$$\chi = \tan^{-1} \frac{\sin \beta + \sin \phi}{\cos \beta + \cos \phi}$$

$$= \tan^{-1} \frac{2 \sin \tfrac{1}{2}(\beta+\phi) \cdot \cos \tfrac{1}{2}(\beta+\phi)}{2 \cos \tfrac{1}{2}(\beta+\phi) \cdot \cos \tfrac{1}{2}(\beta+\phi)}$$

$$= \tan^{-1} \frac{\sin \tfrac{1}{2}(\beta+\phi)}{\cos \tfrac{1}{2}(\beta+\phi)}$$

$$= \tan^{-1} \tan \tfrac{1}{2}(\beta+\phi)$$

$$\therefore \chi = \tfrac{1}{2}(\beta+\phi) \quad (14)$$

Thus the major axis of the displayed ellipse has a bearing which is the arithmetic mean of $\beta$ and $\phi$.

Apart from its use in connection with direction finding systems the present invention may be employed generally in any application where it is desired to bring into frequency and phase alignment waves which are random in these two respects. Thus, for example, in the case of diversity radio reception where two receivers are located some distance apart and the signal, or the receiver I.F. frequency, is transmitted to a central point, the phase relation of the two signals will be quite random due to ionospheric and aerial spacing effects thus rendering direct addition impossible. In this particular case the present invention would be of assistance. Whilst the two above signals would normally be amplitude modulated by a low frequency signal and, therefore, by the simple process of demodulation it is usually possible to directly add the low frequency component as due to its long wavelength its phase may not be so affected by ionospheric effects, under extreme ionospheric disturbance involving multiple path transmission to the aerial the low frequency component of the two waves may not remain in phase alignment. In this circumstance, the present invention could be adopted to give the necessary low frequency phase correction.

In the case of Morse reception employing the usual heterodyne beat tone the two diversity receivers could not be added directly but the present invention could be employed as mentioned in the last paragraph.

Another application could be in connection with multi-element aerials where improvement in the signal to noise ratio or other advantage is sought from the employment of a number of elements. Normally an array will have some directional pattern and the addition of the elements would be through equal length lines or other arrangements to give the desired phase relationship. By using a conversion unit according to the present invention in association with each element new results are posible as irrespective of the signal arrival direction and resulting element relative phase the outputs may be added.

I claim:
1. In a radio receiving system comprising two receiving channels each connected to a separate aerial wherein the phase of the output voltage of each channel is dependent upon the phase of a radio signal received at its respective aerial, means for combining the two output voltages in quadrature, means for producing a reference voltage of constant frequency and phase, and means for modulating each of said output voltages with the modulation product of said reference voltage and said quadrature combined voltage whereby an output signal is provided from each channel which is independent of the phase of said received radio signal.

2. In a radio receiving system comprising at least two radio receiving channels, a first modulator connected to the output of one channel and a second modulator connected to the output of a second channel, a phase quadrature addition circuit connected to the outputs of both of said channels, a reference oscillator, and a third modulator connected to the outputs of said phase quadrature addition circuit and said reference oscillator and having its output connected to said first and second modulators, whereby the phases of the voltage outputs of said first and second modulators are independent of the phases of the voltage outputs of said receiving channels.

3. In a radio direction finding system comprising a twin channel radio receiver and a directional antenna system wherein the output voltage of each of said channels is dependent upon the phase of the received radio signal and the direction from which it originates, means for combining said output voltages in quadrature, means for producing a reference voltage of constant frequency and phase, and means for modulating each of said output voltages with the modulation product of said reference ciation with each element new results are possible as irrepair of output signals is produced which are dependent only upon the direction of said received radio signal.

4. A radio direction finding receiver comprising a first receiving channel having its input connected to one of a pair of orthogonally arranged direction responsive aerials and its output connected to a phase quadrature addition circuit and a first modulator, a second receiving channel having its input connected to the other of said pair of aerials and its output connected to said phase quadrature addition circuit and a second modulator, a local oscillator, and a third modulator having its inputs connected to said local oscillator and to said phase quadrature addition circuit and its output connected to said first and second modulators whereby the outputs of said first and second modulators provide voltages dependent only upon the direction of a signal received by said aerials.

5. A radio direction finder as set forth in claim 4 wherein the outputs of said first and second modulators are connected to means for providing an indication of the direction of a received radio signal.

6. A radio direction finder as set forth in claim 5 wherein said means is a cathode ray oscilloscope.

7. A diversity direction finding system comprising a plurality of twin channel superheterodyne radio receivers, an equal plurality of diversely located aerial systems each including a pair of orthogonally oriented directionally responsive antennae, corresponding antennae of each aerial system being parallel and connected to corresponding channels of their respective radio receivers, a local oscillator, means for modulating the outputs of both channels of each receiver with a signal produced by modulating the quadrature combined output voltages of the respective receivers with the output of said local oscillator, means for combining said modulated outputs of corresponding channels of all of said receivers, and means for displaying said combined outputs.

8. A radio direction finding system comprising a plurality of twin channel receivers each having two inputs and two outputs, a plurality of spaced aerial systems each having a pair of orthogonally oriented directional antennae, corresponding antennae of each aerial system being arranged parallel and connected to corresponding inputs of said receivers, the output voltage of each channel being proportional to the signal received by its respective antennae, means associated with each receiver for producing a quadrature voltage dependent upon the output voltages of both channels, means for producing a reference voltage, means for producing an output signal from each channel dependent upon the modulation products of its output voltage, the quadrature voltage of the respective receivers and said reference voltage, and means for combining the output signals from corresponding channels of all receivers whereby an indication of the arithmetic mean of the direction of a radio signal relative to said aerial systems is provided.

9. A radio direction finding system comprising a plurality of spaced parallelly oriented aerial systems each including a pair of orthogonally arranged directionally responsive antennae, a plurality of twin channel radio receivers, one of said receivers being connected to each aerial system whereby an output voltage is produced by each channel dependent upon the phase and direction of a radio signal received at its respective antenna, a phase quadrature addition circuit associated with each receiver for providing a quadrature voltage dependent upon the output voltages of both channels, a reference oscillator for providing a constant frequency signal, means for modulating each of said quadrature voltages with said constant frequency signal to provide a reference signal for each receiver, means for modulating the output voltages of each receiver with its respective reference signal to provide an output signal from each channel dependent only upon the direction of said radio signal, and means for combining said output signals for indicating the direction of said radio signal.

10. A radio direction finding system comprising a plurality of twin channel receivers each having two inputs and two outputs, a plurality of spaced aerial systems each having a pair of orthogonally oriented directional antennae, corresponding antennae of each aerial system being arranged parallel and connected to corresponding inputs of said receivers, the output voltage of each channel being proportional to the signal received by its respective antenna, means associated with each receiver for producing a quadrature voltage dependent upon the output voltages of both channels, means for producing a reference voltage, and means for intermodulating said output voltages, said quadrature voltages, and said reference voltage whereby the outputs of the receivers are brought substantially into phase alignment.

References Cited

UNITED STATES PATENTS

| | | | |
|---|---|---|---|
| 2,213,273 | 9/1940 | Earp | 343—121 |
| 2,450,014 | 9/1948 | Newitt | 343—121 |
| 2,512,615 | 6/1950 | Earp | 343—121 |

FOREIGN PATENTS

| | | | |
|---|---|---|---|
| 441,964 | 1/1936 | Great Britain | 343—123 |

RODNEY D. BENNETT, JR., Primary Examiner

R. E. BERGER, Assistant Examiner

U.S. Cl. X.R.

325—305; 343—123